United States Patent
Klee

(10) Patent No.: US 8,636,497 B2
(45) Date of Patent: Jan. 28, 2014

(54) EXTRUDER SCREW FOR A SCREW EXTRUDER

(75) Inventor: Christian Klee, Bad Honnef (DE)

(73) Assignee: Kautex Maschinenbau GmbH, Bonn (DE)

( * ) Notice: Subject to any disclaimer, the term of this patent is extended or adjusted under 35 U.S.C. 154(b) by 701 days.

(21) Appl. No.: 12/745,397

(22) PCT Filed: Nov. 3, 2008

(86) PCT No.: PCT/EP2008/009235
§ 371 (c)(1),
(2), (4) Date: May 28, 2010

(87) PCT Pub. No.: WO2009/068151
PCT Pub. Date: Jun. 4, 2009

(65) Prior Publication Data
US 2010/0310693 A1 Dec. 9, 2010

(30) Foreign Application Priority Data
Nov. 28, 2007 (DE) .......................... 10 2007 057 613

(51) Int. Cl.
*B29C 47/62* (2006.01)
(52) U.S. Cl.
USPC .......... 425/204; 366/81; 425/208; 425/376.1; 425/461
(58) Field of Classification Search
USPC ................. 425/204, 208, 376.1, 461; 366/81
See application file for complete search history.

(56) References Cited

U.S. PATENT DOCUMENTS

| 3,271,819 | A | * | 9/1966 | Lacher | 366/89 |
| 3,730,492 | A | * | 5/1973 | Maddock | 366/82 |
| 4,107,788 | A | | 8/1978 | Anders | |

(Continued)

FOREIGN PATENT DOCUMENTS

| DE | 3132429 | 2/1983 |
| DE | 4227018 | 3/1993 |
| JP | 8267540 | 10/1996 |

(Continued)

OTHER PUBLICATIONS

PCT International Search Report dated May 18, 2009, received in corresponding priority PCT Application No. PCT/EP2008/009235, 3 pgs.
English translation—PCT International Preliminary Report on Patentability/Written Opinion dated Jul. 15, 2010, received in corresponding priority PCT Application No. PCT/EP2008/009235, 9 pgs.

*Primary Examiner* — Yogendra Gupta
*Assistant Examiner* — Joseph Leyson
(74) *Attorney, Agent, or Firm* — Grossman Tucker Perreault & Pfleger, PLLC

(57) ABSTRACT

The invention concerns an extruder screw for a screw extruder for plasticizing and/or transporting thermoplastic materials comprising at least one extruder cylinder, a material feed means and at least one extrudate discharge at the end of the extruder cylinder, that is remote from the material feed means. The extruder screw has a screw flight, wherein the extruder screw has at least one intake region and forms at least one transport and mixing region and provided in the transport and mixing region are means for shearing the extrudate. The extruder screw according to the invention is distinguished in that provided as means for shearing the extrudate there is provided at least one shearing land which extends over more than half the length of the extruder screw, over the periphery of the extruder screw, wherein the shearing land is in the nature of a screwthread in opposite relationship to the screw flight.

13 Claims, 5 Drawing Sheets

(56) References Cited

U.S. PATENT DOCUMENTS

Figure 3:
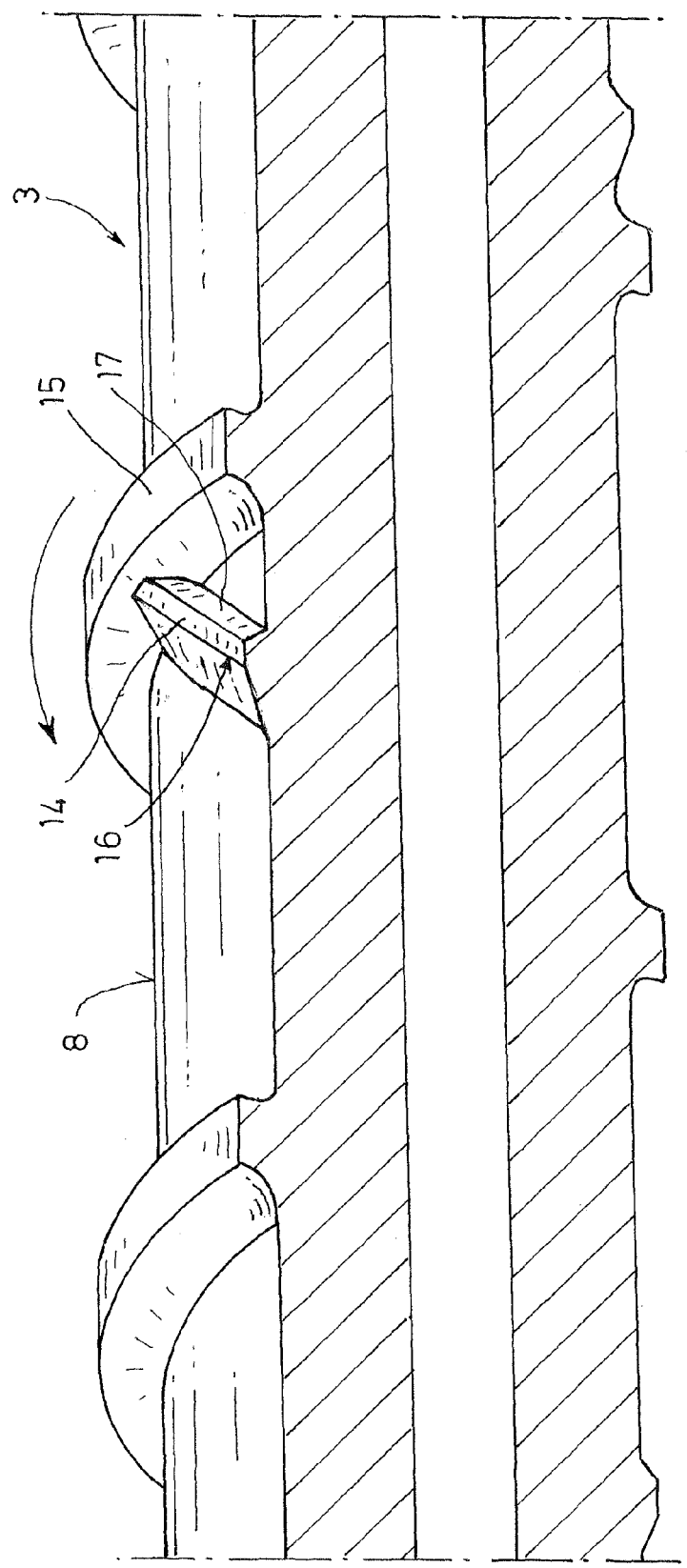

| | | | |
|---|---|---|---|
| 4,384,837 A * | 5/1983 | Murai et al. | 425/202 |
| 5,088,914 A * | 2/1992 | Brambilla | 425/208 |
| 5,798,077 A | 8/1998 | Womer et al. | |
| 7,296,920 B2 | 11/2007 | Zhang et al. | |
| 2004/0257904 A1 * | 12/2004 | Zhang et al. | 366/81 |

FOREIGN PATENT DOCUMENTS

| | | |
|---|---|---|
| JP | 2001062897 | 3/2001 |
| SU | 863384 | 9/1981 |

* cited by examiner

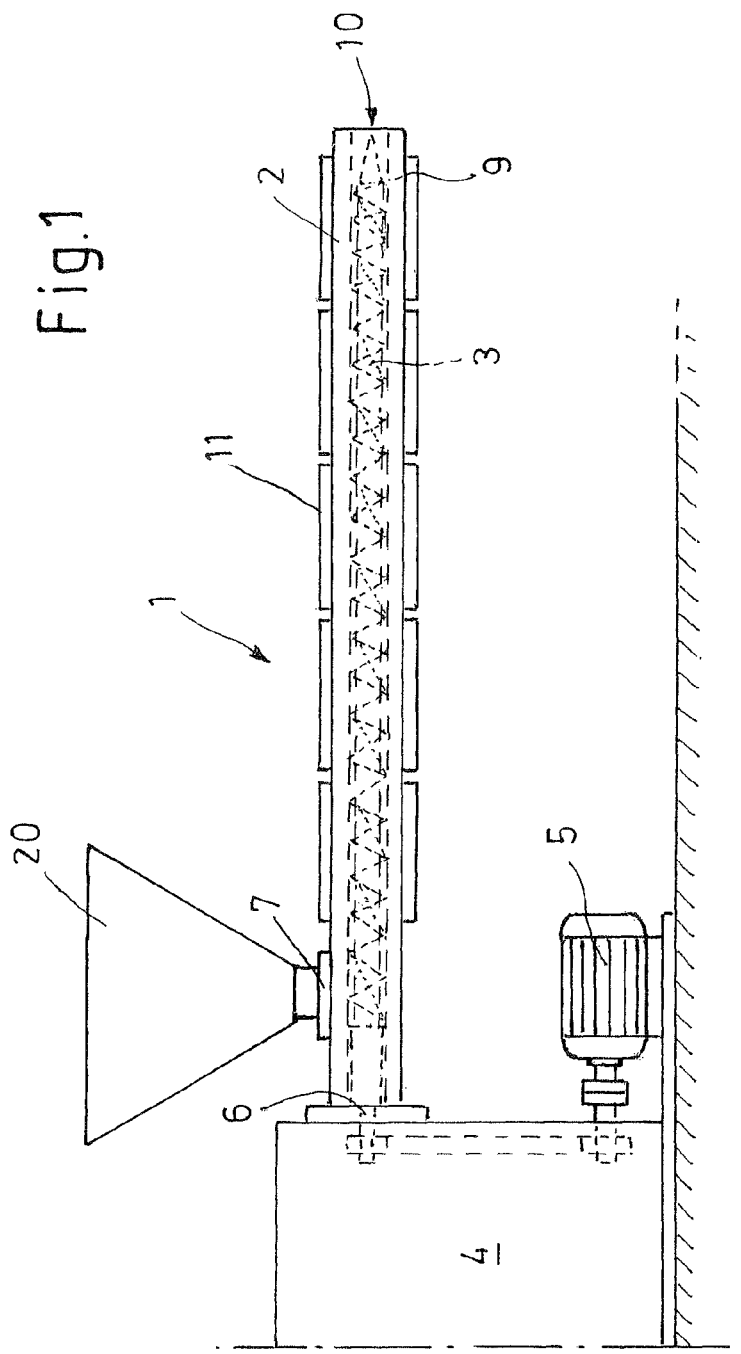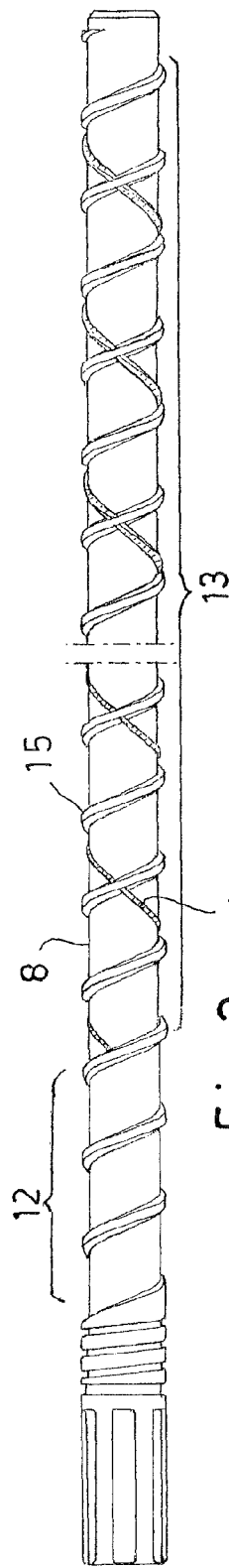

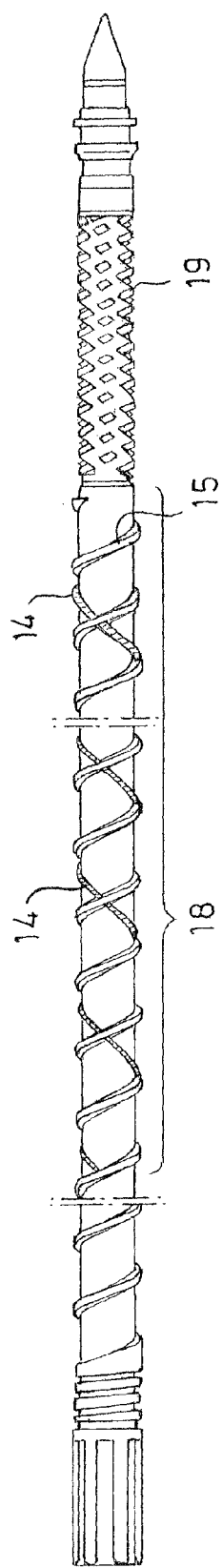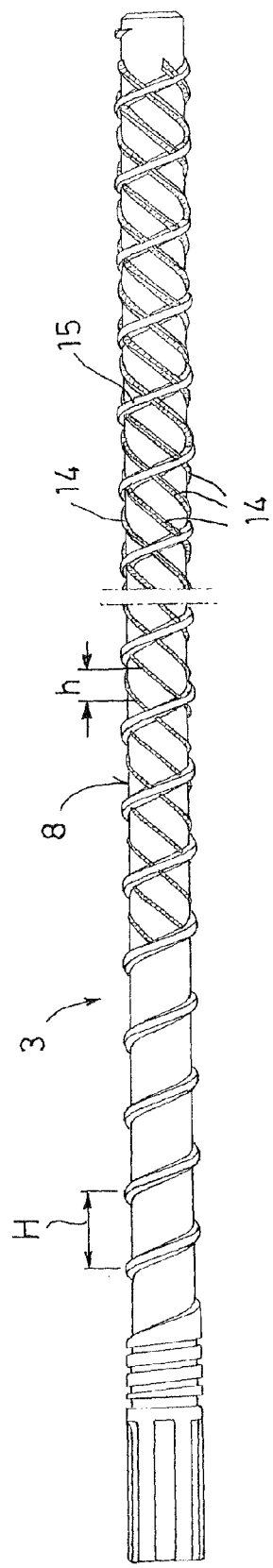

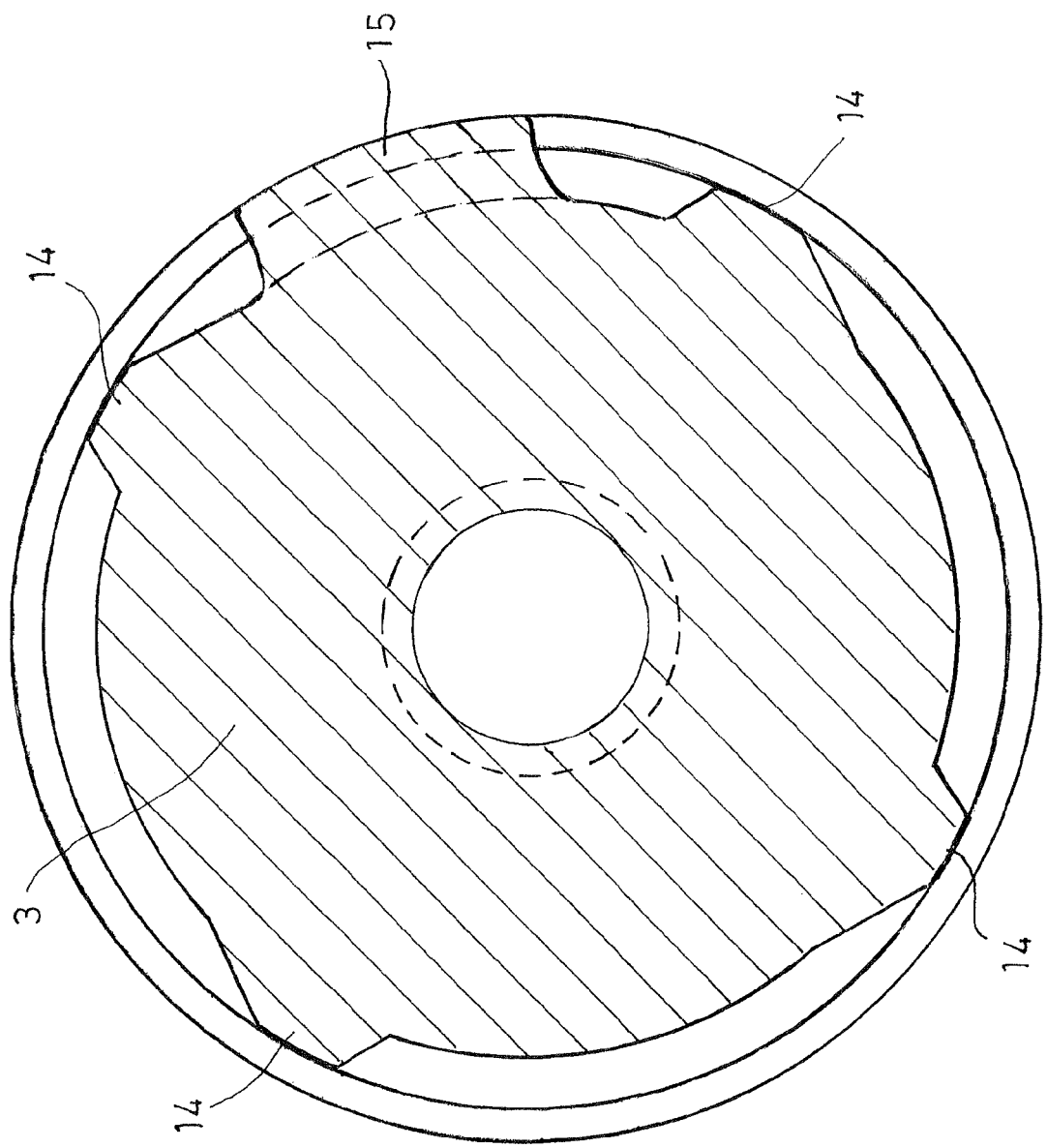

EXTRUDER SCREW FOR A SCREW EXTRUDER

CROSS-REFERENCE TO RELATED APPLICATIONS

This application is a national phase application of PCT application no. PCT/EP08/09235 filed Nov. 3, 2008, which claims priority to German application serial no. 10 2007 057 613.9 filed Nov. 28, 2007 which are hereby incorporated by reference.

FIELD

The invention concerns an extruder screw for a screw extruder for plasticising and/or transporting thermoplastic materials comprising at least one extruder cylinder, a material feed means and at least one extrudate discharge at the end of the extruder cylinder, that is remote from the material feed means, wherein the extruder screw has at least one screw flight, forms an intake region and at least one transport and mixing region and provided in the transport and mixing region are means for shearing the extrudate.

BACKGROUND

DE 31 32 429 C3 relates to an extruder screw of the above-indicated kind, wherein the screw has an intake zone, a transformation zone and an ejection zone. The screw is of a dual-flight nature in the intake zone and in the initial region of the transformation zone. Disposed in the first third of the transformation zone are installation fitments in the form of pins fixed on the periphery of the screw core, in a row arranged at a right angle to the axis of the screw between the screw lands. That enhances the mixing effect within the molten plastic material.

A single-screw extruder for continuously processing thermoplastic materials having a screw which is arranged rotatably in a housing and which has a shearing and a mixing portion is known for example from DE 42 27 018 C2. The shearing and mixing portion is provided in a portion of the extruder screw, that is free from any screw land.

The known shearing and mixing portions are generally of such a nature that a mixing effect of the utmost intensiveness is achieved by installation fitments protruding into the screw flight, over a shortest possible portion of the extruder screw. That leads to a great rise in pressure in the mixing region in question of the extruder screw, whereby an over-proportionally high level of frictional heat is introduced into the extrudate in a comparatively short portion of the extruder screw. That leads to a local increase in the material temperature, which is often undesirable. Usually, screw extruders for plasticising and transporting thermoplastic material are heated by what are referred to as heating belts, but nonetheless a considerable part of the plasticisation energy is introduced into the extrudate by way of shearing of the material. It is therefore desirable to keep the input of frictional heat into the extrudate within reasonable limits.

In addition the mixing portions or mixing parts in accordance with the state of the art suffer from the disadvantage that they represent obstacles to the through-flow of material, which adversely affect the through-put capacity of the extruder.

SUMMARY

Therefore the object of the invention is to improve an extruder screw of the kind set forth in the opening part of this specification, in regard to the above-outlined disadvantages.

The object is attained by an extruder screw for a screw extruder for plasticising and/or transporting thermoplastic materials comprising at least one extruder cylinder, a material feed means and at least one extrudate discharge (10) at the end of the extruder cylinder, that is remote from the material feed means, wherein the extruder screw has at least one screw flight, forms an intake region and at least one transport and mixing region and provided in the transport and mixing region are means for shearing the extrudate, wherein the extruder screw according to the invention is distinguished in that the means for shearing the extrudate include at least one shearing land which extends over at least a third of the length of the extruder screw, preferably over more than half the length of the extruder screw, over the periphery thereof.

The extruder screw according to the invention has at least one screw flight and forms an intake region as well as a transport and mixing region, wherein in the screw flight at least one continuous shearing land or bar extends over the greatest part of the length of extruder screw.

The extruder screw according to the invention can be both a single-flight screw and also a multi-flight screw.

The configuration according to the invention as described hereinbefore has the advantage that shearing of the extrudate occurs over the greatest part of the length of the extruder screw. That provides that less frictional heat is introduced into the extrudate. The introduction of frictional heat occurs comparatively uniformly. At the same time easier mixing of the extrudate is ensured, with a higher throughput level. The uniform introduction of the frictional heat into the extrudate also guarantees in particular that no locally excessive temperatures occur in the flow of material.

In an advantageous variant of the extruder screw according to the invention it is provided that the shearing land is formed in the manner of a screwthread land with a pitch angle extending in opposite relationship to the screw flight.

Desirably the shearing land extends within the screw flight of the extruder screw. The configuration of the shearing land ensures in particular that the extrudate is lifted over the shearing land and mixed over a large part of the length of the extruder screw. In that case the shearing energy is introduced into the extrudate uniformly over a large part of the length of the extruder screw.

It is desirable if the shearing land extends substantially uninterruptedly over the periphery of the extruder screw. An interruption in the shearing land is provided only at the points of intersection with the screw flight land of the extruder screw.

There can be provided for example two or more shearing lands on the periphery of the extruder screw so that the shearing lands form a multi-flight screwthread in opposite relationship to the screwthread of the extruder screw. An arrangement of four shearing lands in relation to a four-flight shearing screwthread has proven to be particularly advantageous.

Preferably the shearing lands are arranged symmetrically on the periphery of the extruder screw.

A variant of the extruder screw according to the invention provides that the flight pitch of the shearing land or lands is greater than the flight pitch of the screw land.

The flight pitch of the shearing land or lands can be between twice and the square of the flight pitch of the screw land.

The shearing lands can extend behind the intake region over approximately the entire length of the extruder screw.

A particularly advantageous variant of the extruder screw according to the invention provides that the height of the shearing land or lands is less than the flight depth of the screw flight. The height of the shearing land or lands can for example continuously increase from the intake region in the direction towards the extrudate discharge. That ensures that a lower counteracting pressure is built up in the intake region of the extruder screw by the shearing lands, and that counteracting pressure continuously increases over the length of the extruder screw in the direction of the extrudate discharge.

An also advantageous variant of the extruder screw according to the invention provides that the shearing land or lands are of an asymmetrical cross-sectional profile which is desirably of such a configuration as to promote a flow of the extrudate over the shearing lands. For that purpose it can be provided that the shearing land or lands have a leading flank in relation to the extrudate conveyor direction and a trailing flank, and the leading flank is of a smaller angle of inclination with respect to the longitudinal center line of the extruder screw than the trailing flank in relation to the conveyor direction. The flank which leads or is at the front in relation to the conveyor direction, that is to say the flank onto which the material runs, can be shallower than the flank over which the material runs away.

The leading flank of the shearing lands can involve for example an angle of inclination of between 15° and 60°, whereas the trailing flank can be of an angle of inclination of between 30° and 90°. Preferably the leading flank has an angle of inclination of about 30° with respect to the horizontal or the longitudinal center line of the extruder screw whereas the trailing flank has an angle of inclination of about 60°.

The extruder screw according to the invention can have an additional mixing and shearing portion which can preferably form a discharge zone of the extruder screw.

To achieve a desired pressure configuration the extruder screw according to the invention preferably has a core diameter which is not constant over its length. For example the core diameter of the extruder screw can increase in stages or continuously upstream of the intake region, in the direction of the conveyor flow. It will be noted however that the invention is to be interpreted such that the core diameter of the extruder screw can also be constant over the length of the screw.

FIGURES

Figure 7:
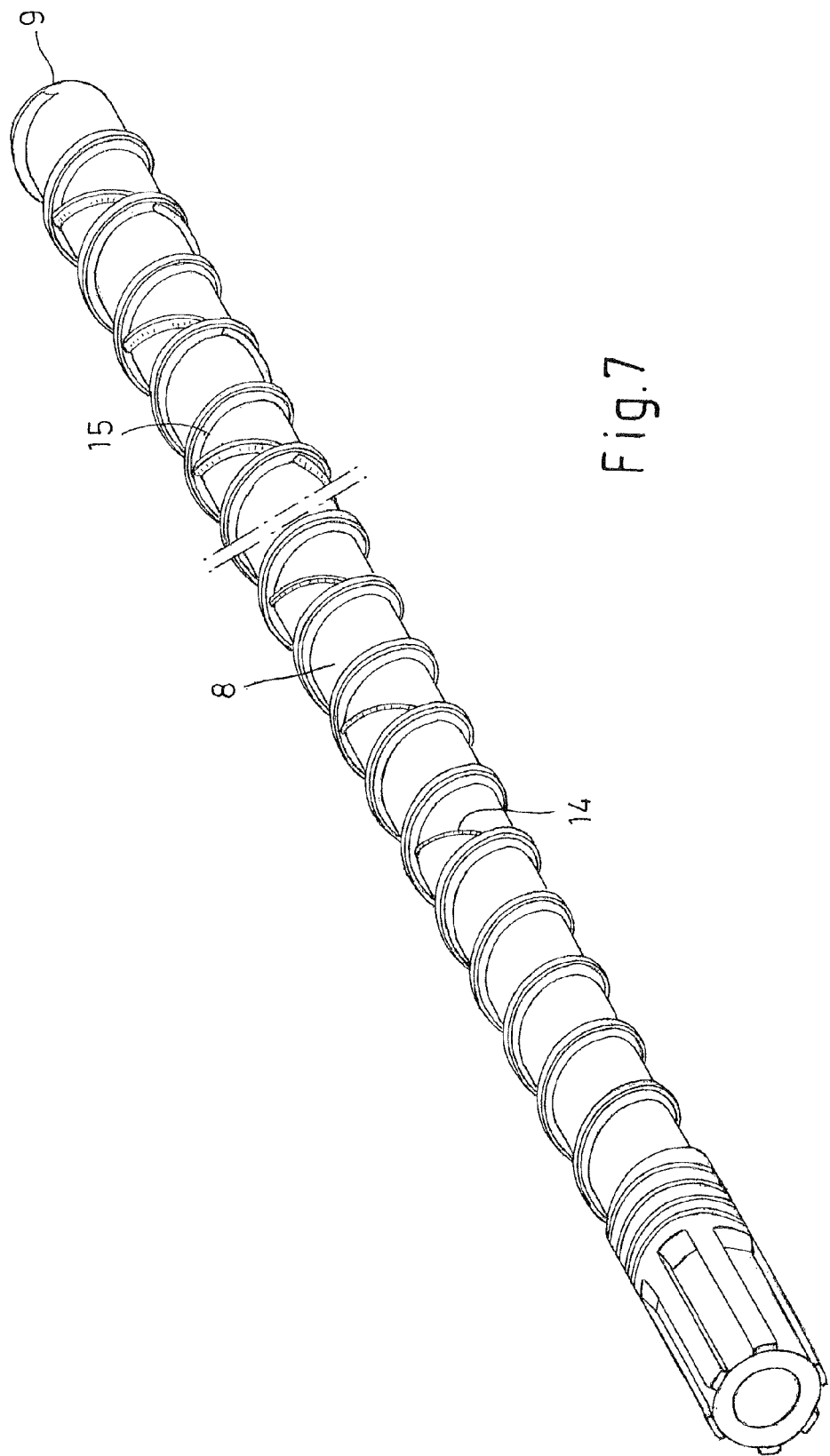

The invention is described hereinafter by means of embodiments by way of example illustrated in the drawings in which:

FIG. 1 shows a diagrammatic view of a screw extruder with an extruder screw according to the invention, FIG. 2 shows a view of a first variant of the extruder screw according to the invention, FIG. 3 shows a view on an enlarged scale in section through the extruder screw of FIG. 2, FIG. 4 shows a view of a further variant of an extruder screw according to the invention with an additional shearing portion, FIG. 5 shows a further embodiment of an extruder screw according to the invention with four shearing lands, FIG. 6 shows a cross-section through the extruder screw of FIG. 5, and FIG. 7 shows a perspective view of the extruder screw of FIG. 1.

DETAILED DESCRIPTION

Referring to FIG. 1 shown therein is a screw extruder 1 having an extruder screw according to the invention, which is in the form of a single-screw extruder. It includes an extruder cylinder 2, an extruder screw 3 rotatably movable within the extruder cylinder 2, a transmission 4 and an electric motor 5. The extruder screw 3 is flange-mounted to a drive output shaft 6 of the transmission 4 and is driven in rotation within the extruder cylinder 2 by means of the electric motor 5 by way of the transmission 4.

A filling opening 7 with a filling hopper 20 connected upstream thereof is provided as the material feed means on the extruder cylinder 2. A thermoplastic material in the form of a granular material is drawn into the extruder cylinder 2 by the extruder screw 3 by way of the filling hopper 20. The extruder screw 3 is provided in per se known manner with a screw flight 8 within which plasticised material or the extrudate is transported in the direction of an extrudate discharge 10 in the region of the screw tip 9. The end of the extruder screw 3, that is remote from the material intake, is referred to hereinafter as the screw tip 9. The screw tip 9 is not shown in FIG. 2 for reasons of simplification.

Reference 11 denotes what are referred to as heating belts which provide for heating up the extruder cylinder 2. The required plasticisation energy is introduced into the extrudate by way of shearing of the granular material and the frictional heat resulting therefrom and by way of the heating belts 11, while at the same time intimate mixing of the molten particles is achieved.

The region of the extruder screw 3 in the region of the material feed means or in the region of the filling opening is generally referred to as the intake region 12 whereas the remaining length of the extruder screw 3 forms the transport and mixing region 13.

In extruder screws in the state of the art, a distinction is usually drawn between an intake region, a shearing region and a discharge region.

An extruder screw 3 designed in accordance with the invention is shown by way of example in FIG. 2. Unlike the state of the art that extruder screw 3 does not have a dedicated shearing region, but rather shearing of the extrudate occurs over almost the entire length of the extruder screw 3, as is described hereinafter. For that purpose the extruder screw 3 has a shearing bar or land 14 which extends in the manner of a screwthread flight over the greatest part of the length of the extruder screw 3. In the embodiment shown in FIG. 2 (see also FIG. 7) the shearing land 14 forms a continuous shearing screwthread, wherein the shearing land 14 has double the flight pitch of the screw land 15, but the opposite angle of inclination and the opposite transport direction. The flight pitch of the shearing land 14 can be between twice and the square of the flight pitch of the screw land 15. It will be noted that the height of the shearing land 14 is less than the height of the screw land 15, more specifically in such a way that the height of the shearing land 14, beginning from zero behind the intake region of the extruder screw 3, rises continuously to the screw tip, to a final magnitude which is smaller than the height of the screw land 15.

That produces shearing of the extrudate, which is operative in opposite relationship to the extrudate conveyor direction, with a shearing action, beginning behind the intake region 12, increasing in a direction towards the screw tip 9. The extrudate conveyor direction with respect to the extruder screw 3 is directed from left to right in FIG. 2. The same applies to the view in FIG. 7 which is a perspective view illustrating the increasing height of the shearing land in a direction towards the screw tip 9.

The geometry of the shearing land can be seen from the sectional view in FIG. 3. Here too the draw flow or conveyor direction of the extrudate is from left to right in the drawing, while the direction of rotation of the extruder screw 3 in this view is in the direction of the illustrated arrow.

The shearing land identified by reference 14 is of an asymmetrical cross-sectional profile, as can readily be seen from the view in FIG. 3, in which case it has a leading flank 16 with respect to the extrudate conveyor direction and a trailing flank 17 in relation to the extrudate conveyor direction. The leading flank 16 is beveled through an angle of 30° with respect to the longitudinal center line of the extruder screw 3 whereas the trailing flank of the shearing land 14 is beveled at an angle of 60° in relation to the extrudate conveyor direction. The trailing flank 17 can equally well extend at an angle of between 30 and 90° with respect to the longitudinal center line of the extruder screw 3. The leading flank 16 can also involve any angular value of between 15° and 60° with respect to the longitudinal center line of the extruder screw 3. The transitions between the shearing lands 14 and the core of the extruder screw as well as the transitions between the screw land 15 and the core of the extruder screw are in the form of radii, which is in part not shown in FIG. 3 for simplification reasons.

In the variant of the extruder screw 3 shown in FIG. 4 it comprises two parts, namely a main screw 18 involving the above-described geometry and an additional shearing portion 19 which is fitted as a separate part onto the main screw 18. It will be appreciated that the additional shearing portion 19 can also be formed integrally with the main screw 18. In the described embodiment the shearing portion 19 defines the outlet zone of the screw extruder 1.

The shearing land 14 extends over the periphery of the extruder screw 3 within the screw flight 8 of the extruder screw 3 and produces a driving force which in opposite relationship to the draw flow or conveyor direction and which causes the extrudate to be sheared and rendered uniform as well as mixed.

In a further embodiment shown in FIG. 5 it is provided that the extruder screw 3 has four shearing lands 14 which act in opposite relationship to the screw screwthread and the flight height h of which is a quarter of the flight height H of the screw flight 8. In the FIG. 5 embodiment the shearing lands 14 form so-to-speak a four-flight shearing screwthread. The term shearing screwthread in accordance with the invention is somewhat of a simplification for, as can be seen from the Figures, the shearing lands 14 admittedly extend continuously or constantly over the periphery of the extruder screw 3 in relation to the core periphery of the screw 3, but they are necessarily interrupted at the points of intersection with the screw lands 15.

LIST OF REFERENCES 1 screw extruder
2 extruder cylinder
3 extruder screw
4 transmission
5 electric motor
6 drive shaft
7 filling opening
8 screw flight
9 screw tip
10 extrudate discharge
11 heating belts
12 intake region
13 transport and mixing region
14 shearing land
15 screw land
16 leading flank of the shearing land
17 trailing flank of the shearing land
18 main screw
19 shearing portion
20 filling hopper

What is claimed is:

1. An extruder screw for a screw extruder for plasticising and/or transporting thermoplastic materials comprising at least one extruder cylinder, a material feed means and at least one extrudate discharge at the end of the extruder cylinder, that is remote from the material feed means, wherein the extruder screw has at least one screw flight including a screw land, forms an intake region and at least one transport and mixing region and provided in the transport and mixing region are means for shearing the extrudate, characterized in that the means for shearing the extrudate include at least one shearing land which extends over at least a third of a length of the extruder screw over the periphery thereof; and
   characterized in that the shearing land is formed in a manner of a screwthread land with a pitch angle extending in opposite relationship to the screw land; and
   characterized in that a height of the at least one shearing land continuously increases from the intake region in a direction towards an extrudate discharge.

2. An extruder screw as set forth in claim 1 characterized in that the shearing land extends over more than half the length of the extruder screw.

3. An extruder screw as set forth in claim 1 characterized in that the shearing land extends within the screw flight of the extruder screw.

4. An extruder screw as set forth in claim 1 characterized in that there are provided at least two shearing lands.

5. An extruder screw as set forth in claim 4 characterized in that the shearing lands are arranged symmetrically on the periphery of the extruder screw.

6. An extruder screw as set forth in claim 1 characterized in that the flight pitch of the shearing land or lands is greater than the flight pitch of the screw land.

7. An extruder screw as set forth in claim 1 characterized in that the flight pitch of the shearing land or lands is between twice and the square of the flight pitch of the screw land.

8. An extruder screw as set forth in claim 1 characterized in that the shearing land or lands extend beginning behind the intake region over substantially the entire length of the extruder screw.

9. An extruder screw as set forth in claim 1 characterized in that the height of the shearing land or lands is less than the height of the screw flight land.

10. An extruder screw as set forth in claim 1 characterized in that the shearing land or lands are of an asymmetrical cross-sectional profile.

11. An extruder screw as set forth in claim 1 characterized in that the shearing land or lands have a leading flank in relation to the extrudate conveyor direction and a trailing flank, and the leading flank is of a smaller angle of inclination with respect to the longitudinal center line of the extruder screw than the trailing flank in relation to the conveyor direction.

12. An extruder screw as set forth in claim 11 characterized in that the leading flank of the shearing land or lands has an angle of inclination of between 15° and 60° and the trailing flank has an angle of inclination of between 30° and 90°.

13. An extruder screw as set forth in claim 1 characterized in that there is provided an additional shearing portion.

* * * * *